Figure 1:
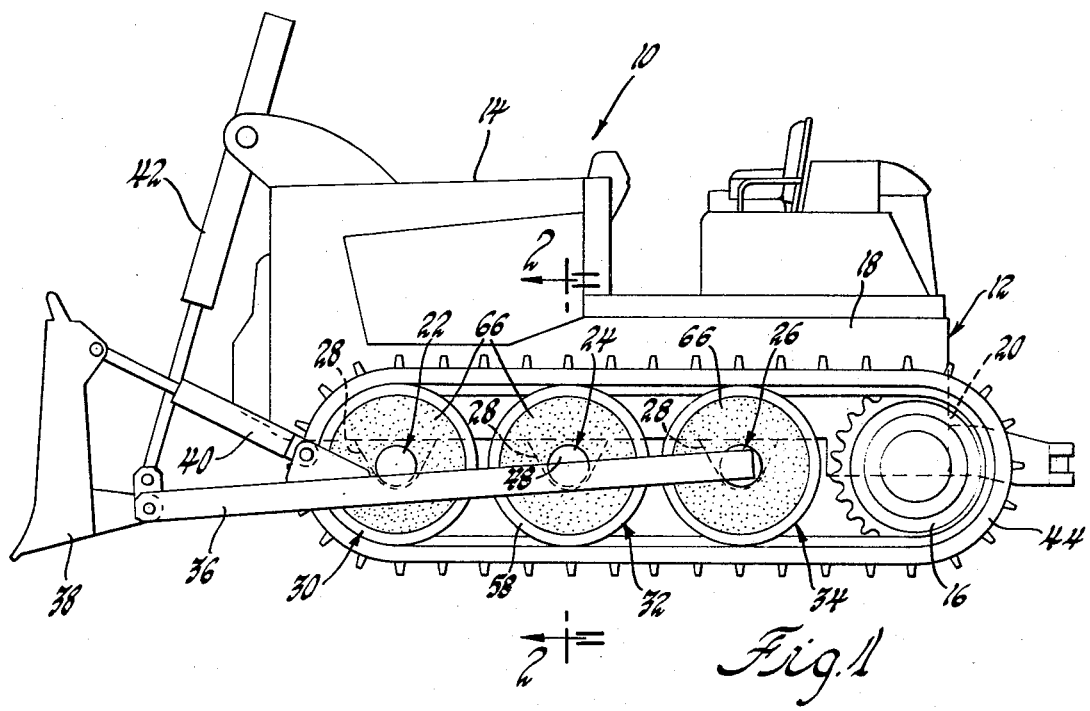

United States Patent
Mazzarins

[15] 3,689,122
[45] Sept. 5, 1972

[54] ROAD WHEEL FOR CRAWLER TRACTOR

[72] Inventor: Janis Mazzarins, Macedonia, Ohio
[73] Assignee: General Motors Corporation, Detroit, Mich.
[22] Filed: Nov. 18, 1970
[21] Appl. No.: 90,625

[52] U.S. Cl. .........................305/27, 152/49, 305/23
[51] Int. Cl. ..............................................B62d 55/16
[58] Field of Search........305/27, 28, 25; 301/63 DD; 152/49, 50, 47, 51; 74/230.05, 230.5

[56] References Cited

UNITED STATES PATENTS

| | | | |
|---|---|---|---|
| 2,463,226 | 3/1949 | Walden | 152/47 |
| 1,409,781 | 3/1922 | Rimailho | 302/27 |
| 2,435,617 | 2/1948 | Werkenthin | 305/27 |
| 2,329,901 | 9/1943 | Herrington | 305/27 |
| 2,830,637 | 4/1958 | Deuring | 152/49 |
| 3,580,093 | 5/1971 | Tomizawa | 152/50 |

FOREIGN PATENTS OR APPLICATIONS

| 104,825 | 9/1938 | Australia | 152/50 |
|---|---|---|---|

Primary Examiner—Richard J. Johnson
Attorney—J. L. Carpenter and E. J. Biskup

[57] ABSTRACT

A road wheel for a crawler tractor having a hub member encircled by a rim member and attached thereto by a ring of resilient material. A cooperating tongue and groove arrangement integrally formed with the hub and rib members interconnects the latter for preventing the rim member from moving laterally relative to the hub member while permitting the rim member to move radially relative to the hub member so as to compress and expand the ring of resilient material when the tractor is traversing uneven terrain.

2 Claims, 2 Drawing Figures

PATENTED SEP 5 1972 3,689,122

INVENTOR.
Janis Mazzarins
BY
E. J. Biskup
ATTORNEY

ROAD WHEEL FOR CRAWLER TRACTOR

My copending patent application Serial No. 81,473 filed Oct. 16, 1970 entitled "Suspension System For Crawler Tractor" and assigned to the assignee of this invention, discloses a suspension arrangement that is particularly adapted for crawler tractors having large diameter wheels. In this regard, the suspension arrangement has a wheel carrier located on each side of the tractor and each wheel carrier is supported for independent oscillation about an axis extending transversely to the longitudinal axis of the tractor. Moreover, each wheel carrier has a pair of large diameter wheels mounted thereon which engage the upper and lower run of the track and serve to maintain track alignment during the operation of the tractor.

The present invention is directed to a crawler tractor having large diameter wheels of the type incorporated with the tractor covered by the above-mentioned patent application. However, rather than having an oscillating wheel carrier arrangement for allowing the tractor to negotiate uneven ground, the present invention utilizes a road wheel which carries its own built-in suspension provided by an elastomeric material located between the rim member and hub member of the wheel. A tongue and groove arrangement is integrally formed with the hub and rim members that coacts so as to prevent the rim member from moving laterally relative to the hub member when the rim member is subjected to side loads. In addition, the tongue and groove arrangement permits the rim member to move radially relative to the hub member so as to compress and expand certain sections of the elastomeric material when a radially directed force is applied to the outer surface of the rim member. Thus, when a road wheel made in accordance with the invention is used with a crawler tractor, the reaction to a turning maneuver is taken by the tongue and groove arrangement, while the vertically applied shock loads on the lower run of the track are absorbed by the elastomeric material.

The objects of the present invention are to provide a vehicle road wheel in which the rim member is movable radially relative to the supporting hub member but is restrained from lateral movement; to provide a large diameter road wheel for a crawler tractor that has a track engaging rim member connected to the hub member by an elastomeric material which serves to cushion vertical movement of the lower run of the track; to provide a crawler tractor having large diameter wheels characterized in that each wheel is rotatably mounted on a rigid spindle connected to the tractor and has a self-contained suspension arrangement provided by an elastomeric material located between the rim member and the hub member; and to provide a road wheel for a vehicle in which the rim member and hub member are formed with an integral tongue and groove arrangement that permits relative radial movement between the members but prevents lateral movement therebetween.

Figure 2:
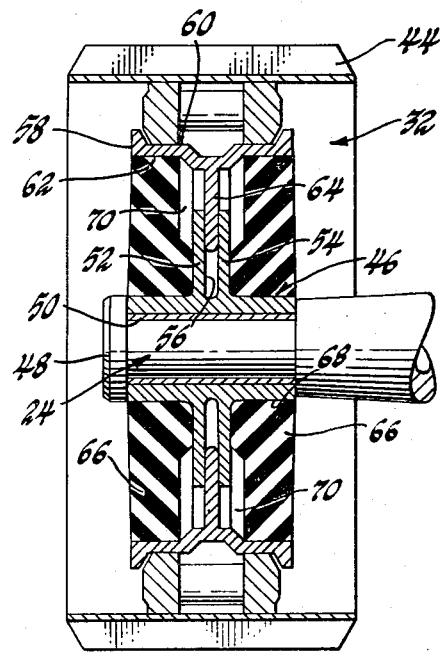

Other objects and advantages of the present invention will be more apparent from the following detailed description when taken with the drawing in which:

FIG. 1 is a side elevational view showing a crawler tractor incorporating road wheels made in accordance with the invention, and FIG. 2 is an enlarged sectional view taken on line 2—2 of FIG. 1 and shows in detail the construction of one of the road wheels.

Referring to the drawing and particularly FIG. 1 thereof, a crawler tractor 10 is shown comprising the usual main frame 12, the front end of which has an engine compartment 14 having a conventional internal combustion engine (not shown). As is usually the case, the internal combustion engine provides drive through a suitable transmission to a pair of laterally spaced drive sprockets, one of which only is shown and identified by the reference numeral 16. In this regard, it will be noted that only one side of the crawler tractor is shown and, accordingly, all parts thereof seen in FIG. 1 have corresponding parts located on the other side of the tractor.

The main frame 12 of the tractor 10 includes a longitudinally extending and vertically orientated side section 18, the rear end of which is formed with a downwardly extending portion 20 for rigidly supporting the usual sprocket housing which rotatably carries the drive sprocket 16. Located forwardly of the portion 20 are three equally spaced and axially aligned spindles 22, 24 and 26, each of which is rigidly connected to the side section 18 of the tractor frame by an integrally formed support housing 28. The respective spindles 22, 24 and 26 rotatably carry identical road wheels 30, 32 and 34 made in accordance with the invention and spindle 26 which is closest to the drive sprocket 16 has the outer portion serving as a pivotal support for the rear end of a push arm 36 which extends forwardly for pivotal connection with a moldboard 38 of a bulldozer assembly. In this instance, the push arm 36 is combined with an adjustable tilt strut 40 for pitching the moldboard about a transverse axis and a lift jack 42 is centrally mounted between the front end of the tractor 10 and the lower rear end of the moldboard 38 for raising the bulldozer assembly about its pivotal connection provided by the spindle 26.

Entrained about the drive sprocket 16 and the large diameter road wheels 30, 32 and 34 is an endless track 44 having a plurality of grousers for engaging the ground. Thus, as is the case in all crawler tractors, as drive is transmitted to the drive sprocket 16, the track 44 is rotated about the road wheels with the lower run of the track 44 acting through the road wheels for supporting the weight of the tractor.

As alluded to hereinbefore, each of the road wheels 30, 32 and 34 are identical in construction and serve as self-contained suspension units that permit the crawler tractor 10 to be driven over uneven ground. In this regard and as seen in FIG. 2, the road wheel 32 comprises a hub member 46 which is rotatably mounted on the spindle 24 and held from axial movement by an end cap 48. A cylindrical bushing 50 is interposed between the spindle 24 and the hub member 46 and serves to minimize wear between the two. A pair of laterally spaced disk members 52 and 54 are integrally formed with the hub member 46 and project radially therefrom in parallel planes so as to define a relatively deep groove 56 therebetween. A cylindrical rim member 58 encircles the hub member 46 and has an outer surface 60 which engages the links supporting the track 44 and an inner surface 62 which is integrally formed with a disk member or tongue 64, the free end of which is located within the groove 56 provided in the hub member 46. Sufficient clearance is provided between the tongue 64 and the disk members defining groove 56 to permit the tongue 64 to move radially relative to the hub member 46 while at the same time resisting any lateral movement therebetween. The radial movement of the rim member 58 is absorbed by a ring 66 of elastomeric material located on each side of the hub member 46 and permanently bonded to the inner surface 62 of the rim member 58 and the outer peripheral surface 68 of the hub member 46. Thus, the elastomeric material serves to maintain the rim member in spaced relationship with respect to the hub member and serves as a resilient suspension for the tractor 10. It will be noted that a portion of the ring of elastomeric material adjacent disk member 64 is reduced in cross section so as to provide an annular hollow area 70 which permits the ring 66 to expand without frictionally interfering with the radial movement of the disk member 64 relative to the groove 56.

From the above description, it should be apparent that when the crawler tractor 10 is making a turn, any side forces which might be acting on the road wheels 30, 32 and 34 are transferred from the rim member 58 to the hub member 46 through the tongue and groove arrangement. On the other hand, when the tractor 10 is traveling over an uneven field, the tongue and groove arrangement permits the rim member 58 to move upwardly relative to the hub member 46. This will cause that portion of ring 66 located below the spindle to be compressed, while the portion located above the spindle is placed in tension.

Finally, it will be understood that in order to resist the large forces imposed upon the push arm 36 during a dozing operation, a shaft would be provided that would extend between and rotatably support the road wheel 34 and the corresponding road wheel on the other side of the tractor 10. The shaft would be secured at intermediate portions thereof to the main frame 12 and transfer all forces thereto. In addition, it will be noted that, although not shown, the hub member 46 can be made as two parts split along a vertical plane that passes between the disk members 52 and 54. In this manner, assembly of the hub member 46 to the rim member 58 is facilitated.

Various changes and modifications can be made in this construction without departing from the spirit of the invention. For example, the ring 66 of elastomeric material need not completely fill the area between the inner surface 62 of the rim member and the outer surface 68 of the hub member, but may be replaced by radiating columns of elastomeric materials arranged as spokes of a wheel. Such changes and modifications are contemplated by the inventor and he does not wish to be limited except by the scope of the appended claims.

I claim:

1. In combination with a crawler tractor having an endless track entrained about a drive sprocket and a plurality of road wheels supported on each side of the tractor, the improvement wherein each of said road wheels comprises a hub member adapted to be rotatably supported by the tractor, a rim member encircling said hub member and having an outer peripheral surface for engaging the track and an inner surface facing the hub member, an elastomeric material located between and permanently bonded to the inner surface of said rim and the outer surface of the hub member, said elastomeric material substantially filling the area between the inner surface of the rim member and the outer surface of the hub member, and cooperating means located intermediate the ends of the hub member and rigidly secured to said hub member and said rim member for preventing the rim member from moving laterally relative to the hub member when the track is subjected to side loads but permitting the rim member to move radially relative to the hub member to compress and expand a portion of said elastomeric material located below said hub member when the tractor is traversing irregular terrain.

2. In combination with a crawler tractor having an endless track entrained about a drive sprocket and a plurality of road wheels rotatably supported by the frame of the tractor along each side thereof, the improvement wherein each of said road wheels comprises a hub member, a rim member concentrically encircling said hub member and having an outer peripheral surface for engaging the track and an inner surface facing the hub member, a ring of resilient material permanently bonded to the inner surface of said rim member and to the outer surface of the hub member, said ring of resilient material substantially filling the area between the inner surface of said rim member and the outer surface of the hub member so as to permit said material located below the hub member to be compressed when the tractor is traversing irregular terrain, a cooperating tongue and groove arrangement integrally formed with said hub member and said rim member for preventing the rim member from moving laterally relative to the hub member when the track is subjected to side loads but permitting the rim member to move radially relative to the hub member to compress and expand said ring of resilient material, and said resilient material having an annular hollow area formed therein adjacent said tongue and groove arrangement for allowing said material to expand without frictionally interfering with the radial movement of the rim member.

* * * * *